United States Patent
Engel

(10) Patent No.: US 6,241,888 B1
(45) Date of Patent: *Jun. 5, 2001

(54) METHOD OF CONTROLLING THE PHOSPHORUS CONCENTRATION IN BIOLOGICAL WASTEWATER PURIFICATION PLANTS

(75) Inventor: Friedrich Engel, Idstein (DE)

(73) Assignee: Hoechst Aktiengesellschaft, Frankfurt am Main (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,334

(22) Filed: Mar. 10, 1998

(30) Foreign Application Priority Data

Mar. 12, 1997 (DE) .............................. 197 10 065

(51) Int. Cl.$^7$ ........................................ C02F 9/00
(52) U.S. Cl. ................... 210/614; 210/739; 210/749; 210/631; 210/906
(58) Field of Search ................... 210/906, 739, 210/614, 749, 631

(56) References Cited

U.S. PATENT DOCUMENTS 5,076,928 * 12/1991 Ballnus .

5,908,555 * 6/1999 Reinsel .

OTHER PUBLICATIONS

Water Science Technology, vol. 33, No. 1, 1997, pp. 165–173, XP002069450 entitled Experiences with Automatic N and P Measurements of an Activated Sludge Process in a Research Environment.

Patent Abstracts of Japan, vol. 015, No. 496, Dec. 16, 1991.

* cited by examiner

Primary Examiner—Chester T. Barry
(74) Attorney, Agent, or Firm—Frommer Lawrence & Haug LLP

(57) ABSTRACT

The invention relates to a method of controlling a biological wastewater purification plant, in which the wastewater is aerated in an activation tank in the presence of an activated sludge and, to influence the properties of the activated sludge, phosphorus is added under controlled concentration, which comprises measuring the phosphorus concentration in the activated sludge for the control of the phosphorus addition and controlling the phosphorus addition in such a manner that the phosphorus concentration in the activated sludge is greater than or equal to a lower limit and is less than or equal to an upper limit. By means of the method according to the invention, the effluent values of a biological wastewater purification plant can be optimized and the limit values in the effluent of a wastewater purification plant prescribed by the authorities can be complied with better than hitherto.

5 Claims, 3 Drawing Sheets

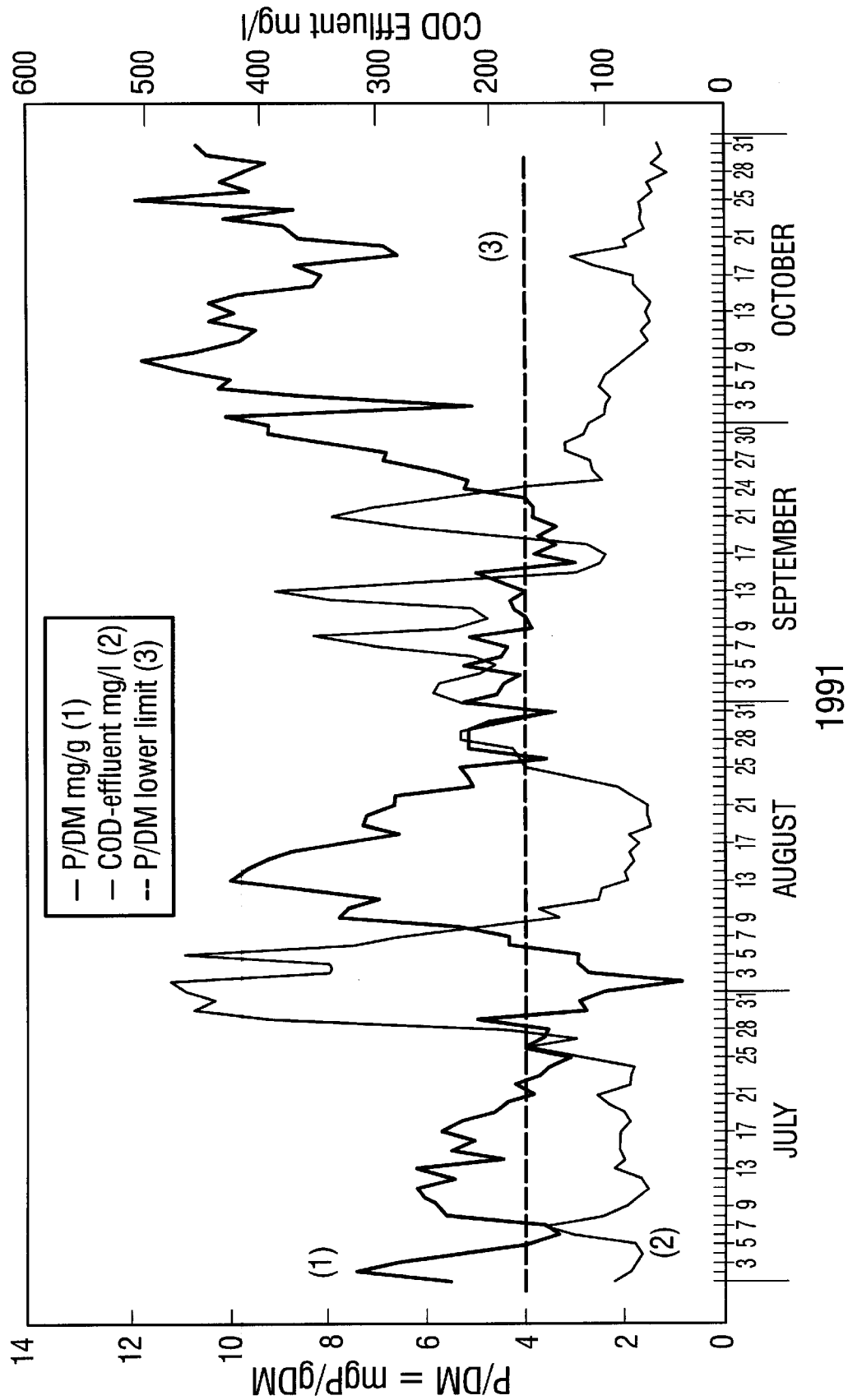

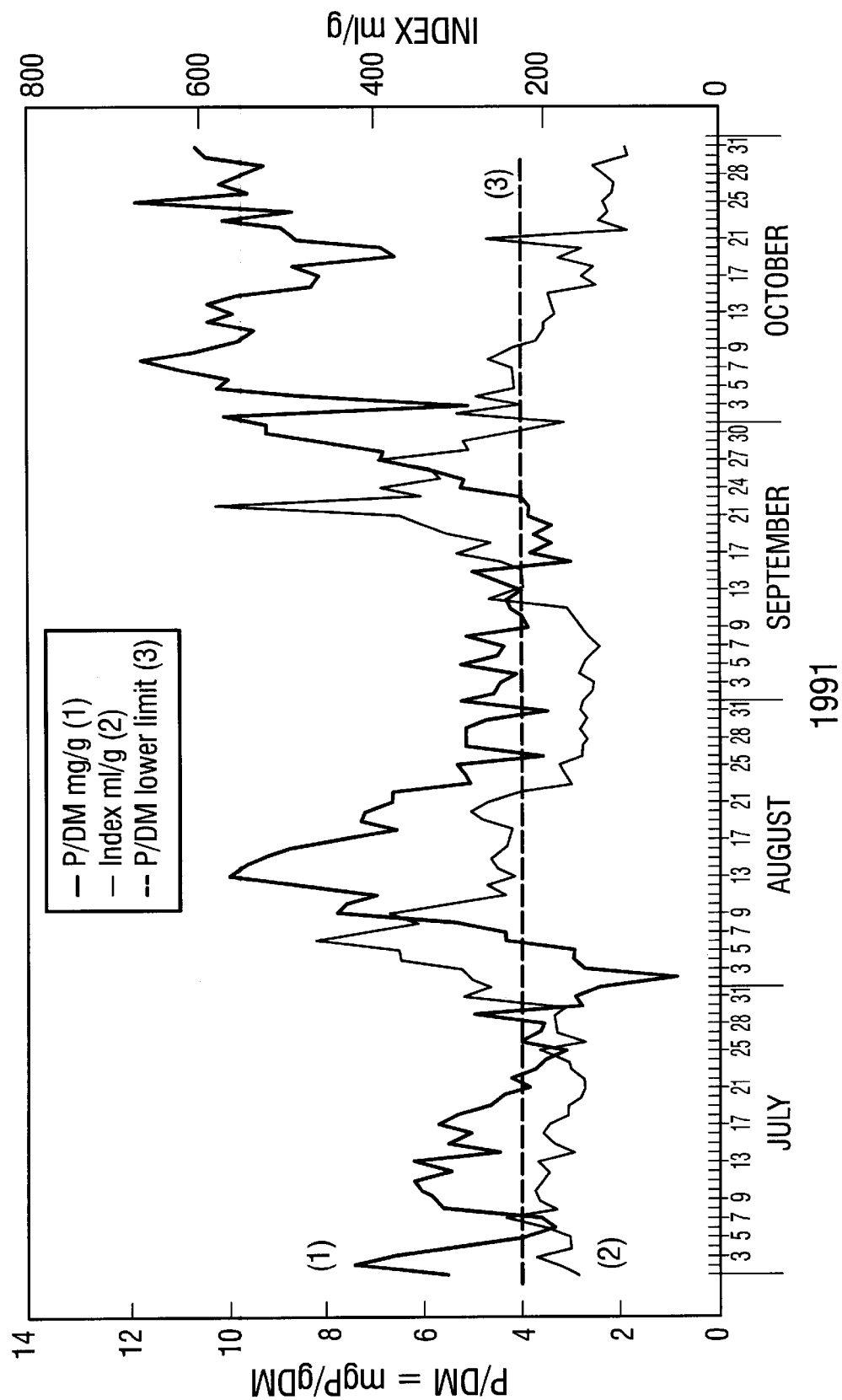

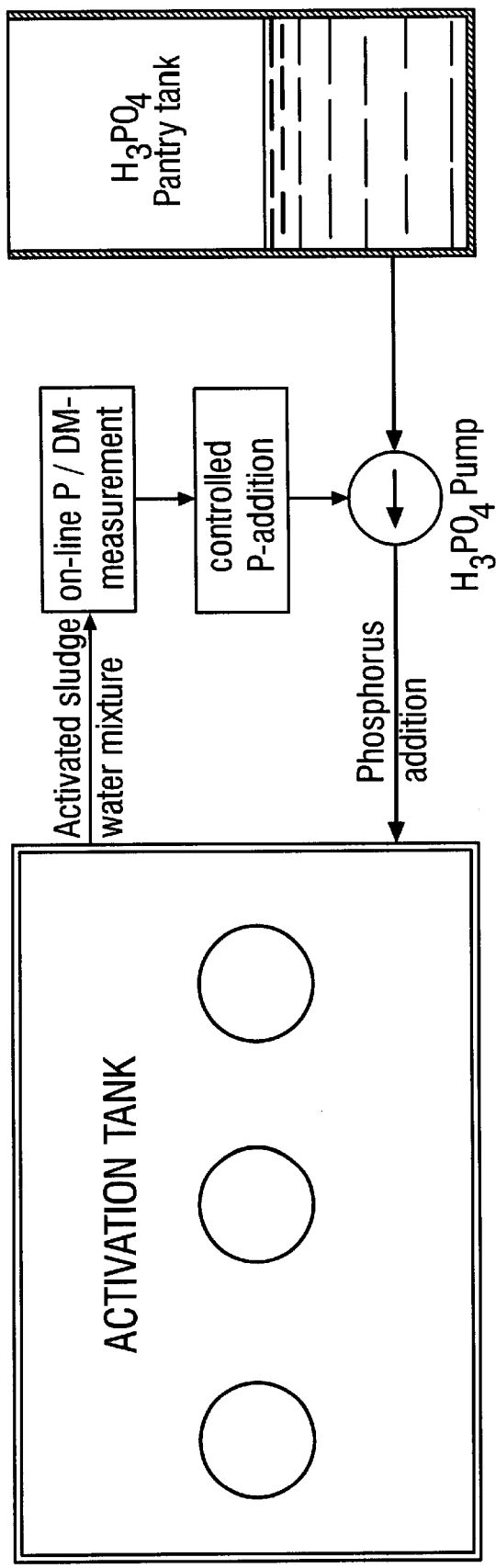
Fig. 3  AUTOMATED PHOSPHORUS ADDITION BY ON-LINE P/DM MEASURING

METHOD OF CONTROLLING THE PHOSPHORUS CONCENTRATION IN BIOLOGICAL WASTEWATER PURIFICATION PLANTS

DESCRIPTION

Method of controlling the phosphorus concentration in biological wastewater purification plants.

The invention relates to a method of controlling a biological wastewater purification plant, in which the wastewater is aerated in an activation tank in the presence of an activated sludge and, to influence the properties of the activated sludge, phosphorus is added under controlled concentration.

According to knowledge to date in the field of biological wastewater purification plants, phosphorus is an element which has an influence on the degradation performance and the sedimentation properties of the activated sludge, more precisely in such a manner that both properties change adversely with decreasing phosphorus concentration. According to prevailing opinion, a phosphorus concentration in the mixed liquor of about 1% by weight (P), based on the biological oxygen demand (BOD5), is the optimum, in which case this optimum concentration may depend on the wastewater and the sludge. However, at the same time, the phosphorus concentration in the plant effluent, i.e. after the secondary clarification stage, which is downstream of the activation stage, must not exceed the limits prescribed by the authorities. Therefore, in the known processes, the phosphorus concentration in the activation tank is adjusted by measuring the phosphorus concentration in the plant effluent and using this value as a basis for controlling the phosphorus addition, usually as aqueous $H_3PO_4$ solution. This control is intended to keep the phosphorus concentration in the effluent constant to an extent.

This known process has the disadvantage that the phosphorus concentration in the effluent fluctuates very greatly, with the risk that the limit value prescribed by the authorities is exceeded.

The object therefore underlying the invention was to improve the known process in such a manner that the fluctuations are at least decreased.

It has now surprisingly been found that this object may be achieved by measuring the phosphorus concentration in the activated sludge for the control of the phosphorus addition and controlling the phosphorus addition in such a manner that the phosphorus concentration in the activated sludge is greater than or equal to a lower limit and is less than or equal to an upper limit.

By means of the method according to the invention, the effluent values of a biological wastewater purification plant can be optimized and the limit values in the effluent of a wastewater purification plant prescribed by the authorities can be complied with better than hitherto.

The invention therefore relates to a method of controlling a biological wastewater purification plant, in which the wastewater is aerated in an activation tank in the presence of an activated sludge and, to influence the properties of the activated sludge, phosphorus is added under controlled concentration, which comprises measuring the phosphorus concentration in the activated sludge for the control of the phosphorus addition and controlling the phosphorus addition in such a manner that the phosphorus concentration in the activated sludge is greater than or equal to a lower limit and is less than or equal to an upper limit.

Preferred embodiments result from the subclaims.

To determine the phosphorus concentration, the method as specified in DIN 38 405 can expediently be used. In this method, the phosphorus concentration is determined in a homogenized mixed liquor and the phosphorus concentration measured in the effluent is subtracted therefrom. This result is divided by the dry matter concentration (dry matter (DM)=dried activated sludge) giving the phosphorus concentration in the activated sludge (P/DM, weight of P/weight of DM) as a result. In a preferred embodiment, the measurement is performed on line, i.e. continuously.

The invention is described in more detail by the experiments described below. This is not intended to restrict the invention in any way.

The example below displays typical concentration data from an industrial wastewater purification plant.

| Example: | Phosphorus concentration from the homogenized mixed liquor mg/l | 40.5 mg/l |
|---|---|---|
| − | phosphorus concentration from the effluent water mg/l | −0.5 g/l |
| : | dry matter content in activation g/l | :5.0 g/l |
| = | phosphorus concentration in dry matter (mg P/g DM) | =8 mg/Pg DM |

From this basis, the extent to which phosphorus may be concentrated in the activated sludge without it being released into the effluent water as excess was to be investigated. The addition of phosphorus (phosphoric acid) to the activation tank concentrated the P/DM content in the activated sludge until a saturation limit of approximately 8–10 mg P/DM was reached and an excess of at least 0.5 mg/l Ptot. in the effluent water was detected. The P/DM content was then decreased by underfeeding, i.e. by interrupting the addition, until only low concentrations of Ptot. (approximately 0.1–0.2 mg/I) were detected in the effluent. It was established that after a relatively long phase below approximately 5 mgP/gDM poorer COD degradation is found, and below approximately 4 mgP/gDM, poorer sedimentation of the activated sludge is found.

This experiment was repeated a few times in the course of four months and is reproducible. A depletion of the P content below the limit of approximately 4 mgP/gDM led after some time to heavy sludge output in the plant effluent. In order not to continually endanger the plant effluent values, the experiment was interrupted and countermeasures were taken before the limits were undershot or exceeded.

From the observations of the plant behavior in preceding years, it may be concluded that, for each biological wastewater purification plant and for each wastewater, there is an individual upper and lower limit of pohosphorus concentration in the activated sludge which ensures optimum biodegradation and favorable sedimentation properties of the activated sludge, with the limits needing to be determined experimentally. In this manner, the effluent values can be optimized and the limit values in the effluent of a wastewater purification plant prescribed by the authorities can be complied with.

In said industrial wastewater purification plant, at P/DM concentrations below approximately 5 mg P/gDM the phosphorus addition is increased, whereas at P/DM concentrations above 8–10 mg P/gDM the phosphorus addition is reduced. This novel type of phosphorus monitoring and control makes it possible to maintain optimum saturation of the activated sludge with phosphorus and to avoid critical ranges.

It was established that primarily the P/DM upper limits, but also the lower limits, are not fixed limits, but can vary depending on the state of the biocoenosis and the wastewater supplied and must be determined for each plant and wastewater. However, even in the case of highly fluctuating wastewaters, a bandwidth of approximately 3–5 mgP/gDM always remains in which action can be taken without exceeding or falling below the critical saturation limits.

Experiments have further found that it is possible, by using a $PO_4$-on line measuring instrument (here from STIP; Siepmann und Teutscher in D-64823 Groβ Umstadt) at the activation tank, to charge the instrument with the mixed liquor from the activation stage and thus monitor the P content in the activated sludge on line. Since the DM content in the activation tank is generally kept constant, the P/DM value can also be readily monitored on days when there is no analytical service. This value correlates very well with the values found in the laboratory.

Experimental results are summarized and depicted graphically in Tables 1 to 4 and FIGS. 1 and 2. In these, SV30 designates the relative sludge volume after 30 min of settling time (DIN method). The index is the quotient of SV30 and DM. ML designates the mixed liquor. The P/DM lower limit may be recognized very readily. It was therefore plotted on the diagrams. Since the P/DM upper limits are highly dependent on the wastewater composition, they were not depicted on the graphs.

In FIG. 1, the P/DM values are plotted in association with the COD effluent values (chemical oxygen demand). The higher effluent values at the end of August/beginning of September are due to temporarily poorly degradable wastewater.

In FIG. 2, the P/DM values are plotted in conjunction with the sedimentation properties of the activated sludge which are characterized by the sludge index.

In all of the examples shown, a marked dependence on the P/DM content, the sedimentation properties and the COD degradation was found. By means of this possibility of monitoring the phosphorus concentration in the activated sludge and a targeted phosphorus addition, the effluent concentrations for COD and phosphorus can be optimized in sewage treatment plants.

The flow diagram in the FIG. 3 shows diagrammatically an automated phosphorus addition.

TABLE 1

Phosphorus determination - Industrial wastewater purification plant

| Date | Activated sludge | | | | Phosphorus concentration | | | | Effluent |
|---|---|---|---|---|---|---|---|---|---|
| 1991 July | SV30 ml/l | DM g/l | Index ml/g | ML mg/l | Filtrate mg/l | Difference mg/l | Effluent mg/l | P/DM mg/g | COD mg/l |
| 1 | 450 | 2.8 | 161 | 15.7 | 0.3 | 15.4 | 0.3 | 5.5 | 95 |
| 2 | 400 | 2.2 | 182 | 16.9 | 0.3 | 16.6 | 0.2 | 7.5 | 80 |
| 3 | 600 | 2.8 | 214 | 19.1 | 0.3 | 18.8 | 0.2 | 6.7 | 75 |
| 4 | 540 | 3.2 | 169 | 16.7 | 0.2 | 16.5 | 0.3 | 5.2 | 70 |
| 5 | 550 | 3.2 | 172 | 13.2 | 0.3 | 12.9 | 0.3 | 4.0 | 75 |
| 6 | 600 | 3.1 | 194 | 10.5 | 0.3 | 10.2 | 0.4 | 3.3 | 130 |
| 7 | 740 | 3.0 | 247 | 11.4 | 0.6 | 10.8 | 0.2 | 3.6 | 155 |
| 8 | 570 | 3.1 | 184 | 17.7 | 0.3 | 17.4 | 0.3 | 5.6 | 105 |
| 9 | 630 | 3.0 | 210 | 17.7 | 0.3 | 17.4 | 0.4 | 5.8 | 85 |
| 10 | 600 | 2.8 | 214 | 17.5 | 0.4 | 17.1 | 0.3 | 6.1 | 75 |
| 11 | 570 | 2.8 | 204 | 17.7 | 0.3 | 17.4 | 0.4 | 6.2 | 65 |
| 12 | 600 | 3.1 | 194 | 17.0 | 0.4 | 16.6 | 0.4 | 5.4 | 70 |
| 13 | 630 | 3.0 | 210 | 19.0 | 0.5 | 18.5 | 0.5 | 6.2 | 95 |
| 14 | 540 | 3.3 | 164 | 15.0 | 0.5 | 14.5 | 0.4 | 4.4 | 85 |
| 15 | 570 | 3.0 | 190 | 17.1 | 0.5 | 16.6 | 0.5 | 5.5 | 90 |
| 16 | 570 | 2.8 | 204 | 14.4 | 0.5 | 13.9 | 0.6 | 5.0 | 90 |
| 17 | 570 | 2.9 | 197 | 17.0 | 0.5 | 16.5 | 0.4 | 5.7 | 90 |
| 18 | 570 | 3.3 | 173 | 17.9 | 0.4 | 17.5 | 0.4 | 5.3 | 80 |
| 19 | 570 | 3.3 | 173 | 15.6 | 0.4 | 15.2 | 0.3 | 4.6 | 85 |
| 20 | 520 | 3.3 | 158 | 14.7 | 0.3 | 14.4 | 0.3 | 4.4 | 100 |
| 21 | 570 | 3.7 | 154 | 14.3 | 0.3 | 14 | 0.3 | 3.8 | 110 |
| 22 | 540 | 3.5 | 154 | 15.0 | 0.4 | 14.6 | 0.4 | 4.2 | 80 |
| 23 | 540 | 3.2 | 169 | 12.2 | 0.5 | 11.7 | 0.4 | 3.7 | 80 |
| 24 | 520 | 520 | 173 | 10.9 | 0.4 | 10.5 | 0.3 | 3.5 | 75 |
| 25 | 540 | 2.6 | 208 | 8.5 | 0.6 | 7.9 | 1.7 | 3.0 | 120 |
| 26 | 450 | 3.0 | 150 | 13.6 | 1.9 | 11.7 | 1.5 | 3.9 | 170 |
| 27 | 540 | 2.9 | 186 | 11.8 | 1.5 | 10.3 | 1.4 | 3.6 | 125 |
| 28 | 510 | 2.7 | 189 | 10.7 | 1.3 | 9.4 | 1.2 | 3.5 | 185 |
| 29 | 510 | 2.7 | 189 | 14.4 | 1.0 | 13.4 | 0.9 | 5.0 | 395 |
| 30 | 540 | 3.1 | 174 | 9.1 | 0.8 | 8.3 | 0.7 | 2.7 | 460 |
| 31 | 800 | 2.7 | 296 | 8.3 | 0.6 | 7.7 | 0.6 | 2.9 | 440 |

TABLE 2

Phosphorus determination - Industrial wastewater purification plant

| Date | Activated sludge | | | Phosphorus concentration | | | | | Effluent |
|---|---|---|---|---|---|---|---|---|---|
| 1991 Aug. | SV30 ml/l | DM g/l | Index ml/g | ML mg/l | Filtrate mg/l | Difference mg/l | Effluent mg/l | P/DM mg/g | COD mg/l |
| 1  | 600  | 2.3 | 261 | 6.0   | 0.5  | 5.5   | 0.9 | 2.4  | 465 |
| 2  | 750  | 2.6 | 288 | 7.0   | 4.8  | 2.2   | 0.7 | 0.8  | 480 |
| 3  | 920  | 3.1 | 297 | 8.9   | 0.5  | 8.4   | 0.6 | 2.7  | 340 |
| 4  | 960  | 2.6 | 369 | 7.8   | 0.3  | 7.5   | 0.5 | 2.9  | 340 |
| 5  | 1000 | 2.7 | 370 | 8.3   | 0.5  | 7.8   | 0.6 | 2.9  | 470 |
| 6  | 1320 | 2.8 | 471 | 12.6  | 0.6  | 12.0  | 0.7 | 4.3  | 320 |
| 7  | 1250 | 3.1 | 403 | 13.8  | 0.5  | 13.3  | 0.6 | 4.3  | 275 |
| 8  | 1000 | 2.9 | 345 | 16.1  | 0.8  | 15.3  | 0.7 | 7.8  | 140 |
| 9  | 1000 | 2.6 | 385 | 21.2  | 0.9  | 20.3  | 0.7 | 7.8  | 140 |
| 10 | 920  | 2.9 | 317 | 30.0  | 8.0  | 22.0  | 0.8 | 7.6  | 160 |
| 11 | 920  | 3.8 | 242 | 37.0  | 10.3 | 26.7  | 0.8 | 6.9  | 105 |
| 12 | 800  | 3.0 | 267 | 26.2  | 0.9  | 25.3  | 1.2 | 8.4  | 105 |
| 13 | 720  | 3.1 | 232 | 33.7  | 2.8  | 30.9  | 2.7 | 10.0 | 80  |
| 14 | 800  | 3.1 | 258 | 32.5  | 2.5  | 30.0  | 1.5 | 9.7  | 85  |
| 15 | 760  | 2.9 | 262 | 28.4  | 1.4  | 27.0  | 1.3 | 9.3  | 75  |
| 16 | 640  | 2.6 | 246 | 23.4  | 0.9  | 22.5  | 1.0 | 8.7  | 80  |
| 17 | 720  | 3.0 | 240 | 23.5  | 0.5  | 23.0  | 0.8 | 7.7  | 70  |
| 18 | 880  | 3.7 | 238 | 24.5  | 0.3  | 24.2  | 0.5 | 6.5  | 80  |
| 19 | 840  | 3.1 | 271 | 22.8  | 0.3  | 22.5  | 0.3 | 7.3  | 60  |
| 20 | 720  | 2.5 | 288 | 18.3  | 0.2  | 18.1  | 0.3 | 7.2  | 65  |
| 21 | 720  | 2.7 | 267 | 18.1  | 0.3  | 17.8  | 0.3 | 6.6  | 65  |
| 22 | 600  | 2.6 | 231 | 17.5  | 0.3  | 17.2  | 0.3 | 6.6  | 75  |
| 23 | 600  | 3.6 | 167 | 18.3  | 0.4  | 17.9  | 0.3 | 5.0  | 90  |
| 24 | 520  | 3.0 | 173 | 15.6  | 0.2  | 15.4  | 0.3 | 5.1  | 125 |
| 25 | 440  | 2.4 | 183 | 131.1 | 0.3  | 130.8 | 0.3 | 5.3  | 169 |
| 26 | 480  | 3.1 | 155 | 11.3  | 0.3  | 11.0  | 0.3 | 3.5  | 170 |
| 27 | 480  | 3.1 | 155 | 16.1  | 0.3  | 15.8  | 0.3 | 5.1  | 180 |
| 28 | 420  | 2.8 | 150 | 14.8  | 0.4  | 14.4  | 0.2 | 5.1  | 225 |
| 29 | 440  | 2.8 | 157 | 14.4  | 0.2  | 14.2  | 0.3 | 5.1  | 225 |
| 30 | 480  | 3.2 | 150 | 15.2  | 0.3  | 14.9  | 0.3 | 4.7  | 190 |
| 31 | 520  | 3.3 | 158 | 11.1  | 0.2  | 10.9  | 0.3 | 3.3  | 150 |

TABLE 3

Phosphorus determination - Industrial wastewater purification plant

| Date | Activated sludge | | | Phosphorus concentration | | | | | Effluent |
|---|---|---|---|---|---|---|---|---|---|
| 1991 Sept. | SV30 ml/l | DM g/l | Index ml/g | ML mg/l | Filtrate mg/l | Difference mg/l | Effluent mg/l | P/DM mg/g | COD mg/l |
| 1  | 450  | 2.9 | 155 | 15.2 | 0.2 | 15.0 | 0.3 | 5.2 | 225 |
| 2  | 460  | 3.2 | 144 | 14.5 | 0.2 | 14.3 | 0.3 | 4.5 | 250 |
| 3  | 440  | 3.1 | 142 | 14.0 | 0.3 | 13.7 | 0.3 | 4.4 | 245 |
| 4  | 560  | 3.5 | 160 | 14.2 | 0.2 | 14.0 | 0.4 | 4.0 | 210 |
| 5  | 480  | 3.1 | 155 | 16.3 | 0.3 | 16.0 | 0.4 | 5.2 | 195 |
| 6  | 440  | 3.0 | 147 | 13.6 | 0.4 | 13.2 | 0.4 | 4.4 | 215 |
| 7  | 400  | 3.0 | 133 | 13.2 | 0.3 | 12.9 | 0.3 | 4.3 | 295 |
| 8  | 400  | 2.7 | 148 | 14.0 | 0.3 | 13.7 | 0.3 | 5.1 | 355 |
| 9  | 450  | 2.9 | 155 | 11.3 | 0.4 | 10.9 | 0.1 | 3.8 | 230 |
| 10 | 540  | 3.3 | 164 | 13.2 | 0.2 | 13.0 | 0.2 | 3.9 | 200 |
| 11 | 570  | 3.3 | 173 | 14.2 | 0.3 | 13.9 | 0.3 | 4.2 | 215 |
| 12 | 600  | 2.3 | 261 | 10.3 | 0.4 | 9.9  | 0.4 | 4.3 | 340 |
| 13 | 630  | 2.8 | 225 | 11.7 | 0.5 | 11.2 | 0.6 | 4.0 | 390 |
| 14 | 750  | 3.3 | 227 | 14.8 | 0.3 | 14.5 | 0.9 | 4.4 | 230 |
| 15 | 750  | 3.3 | 227 | 16.9 | 0.3 | 16.6 | 1.2 | 5.0 | 125 |
| 16 | 800  | 3.2 | 250 | 10.7 | 1.4 | 9.3  | 1.2 | 2.9 | 105 |
| 17 | 840  | 2.8 | 300 | 11.4 | 0.9 | 10.5 | 0.7 | 3.8 | 100 |
| 18 | 780  | 3.0 | 260 | 10.7 | 0.9 | 9.8  | 0.6 | 3.3 | 115 |
| 19 | 880  | 2.8 | 314 | 10.9 | 0.6 | 10.3 | 0.5 | 3.7 | 185 |
| 20 | 1000 | 2.9 | 345 | 10.3 | 0.6 | 9.7  | 0.5 | 3.3 | 280 |

TABLE 3-continued

Phosphorus determination - Industrial wastewater purification plant

| Date | Activated sludge | | | Phosphorus concentration | | | | | Effluent |
|---|---|---|---|---|---|---|---|---|---|
| 1991 Sept. | SV30 ml/l | DM g/l | Index ml/g | ML mg/l | Filtrate mg/l | Difference mg/l | Effluent mg/l | P/DM mg/g | COD mg/l |
| 21 | 960 | 2.6 | 369 | 10.3 | 0.5 | 9.8 | 0.5 | 3.8 | 340 |
| 22 | 1400 | 2.4 | 583 | 9.5 | 0.5 | 9.0 | 0.5 | 3.8 | 305 |
| 23 | 920 | 2.7 | 341 | 10.9 | 0.5 | 10.4 | 0.5 | 3.9 | 245 |
| 24 | 980 | 2.5 | 392 | 13.4 | 0.5 | 12.9 | 0.4 | 5.2 | 185 |
| 25 | 920 | 2.9 | 317 | 15.2 | 0.4 | 14.8 | 0.4 | 5.1 | 103 |
| 26 | 900 | 2.7 | 333 | 16.1 | 0.4 | 15.7 | 0.4 | 5.8 | 111 |
| 27 | 1010 | 2.6 | 388 | 18.3 | 0.4 | 17.9 | 0.4 | 6.9 | 113 |
| 28 | 880 | 3.1 | 284 | 21.4 | 0.4 | 21.0 | 0.3 | 6.8 | 135 |
| 29 | 880 | 3.0 | 293 | 24.1 | 0.3 | 23.8 | 0.3 | 7.9 | 136 |
| 30 | 750 | 3.3 | 227 | 30.6 | 0.3 | 30.3 | 0.4 | 9.2 | 117 |

TABLE 4

Phosphorus determination - Industrial wastewater purification plant

| Date | Activated sludge | | | Phosphorus concentration | | | | | Effluent |
|---|---|---|---|---|---|---|---|---|---|
| 1991 Aug. | SV30 ml/l | DM g/l | Index ml/g | ML mg/l | Filtrate mg/l | Difference mg/l | Effluent mg/l | P/DM mg/g | COD mg/l |
| 1 | 540 | 3.1 | 174 | 28.8 | 0.3 | 28.5 | 0.5 | 9.2 | 155 |
| 2 | 840 | 2.8 | 300 | 28.8 | 0.5 | 28.3 | 0.5 | 10.1 | 100 |
| 3 | 720 | 3.1 | 232 | 16.3 | 0.8 | 15.5 | 0.5 | 5.0 | 100 |
| 4 | 780 | 2.8 | 279 | 24.3 | 0.5 | 23.8 | 0.7 | 8.5 | 95 |
| 5 | 600 | 2.6 | 231 | 27.3 | 0.9 | 26.4 | 0.8 | 10.2 | 105 |
| 6 | 600 | 2.6 | 231 | 26.5 | 0.8 | 25.7 | 0.9 | 9.9 | 102 |
| 7 | 540 | 2.3 | 235 | 26.3 | 1.0 | 25.3 | 0.8 | 11.0 | 95 |
| 8 | 660 | 2.5 | 264 | 30.0 | 0.4 | 29.6 | 0.3 | 11.8 | 81 |
| 9 | 600 | 2.5 | 240 | 26.9 | 0.3 | 26.6 | 0.1 | 10.6 | 72 |
| 10 | 600 | 2.9 | 207 | 28.4 | 0.2 | 28.2 | 0.3 | 9.7 | 62 |
| 11 | 600 | 3.0 | 200 | 28.4 | 0.2 | 28.2 | 0.3 | 9.4 | 69 |
| 12 | 600 | 3.0 | 200 | 31.5 | 0.3 | 31.2 | 0.2 | 10.4 | 61 |
| 13 | 570 | 3.1 | 184 | 30.6 | 0.2 | 30.4 | 0.2 | 9.8 | 65 |
| 14 | 600 | 3.2 | 188 | 33.3 | 0.1 | 33.2 | 0.3 | 10.4 | 60 |
| 15 | 600 | 3.1 | 194 | 30.6 | 0.1 | 30.5 | 0.2 | 9.8 | 67 |
| 16 | 460 | 3.4 | 135 | 28.0 | 0.1 | 27.9 | 0.1 | 8.2 | 75 |
| 17 | 480 | 3.1 | 155 | 25.3 | 0.1 | 25.2 | 0.1 | 8.1 | 75 |
| 18 | 280 | 2.0 | 140 | 17.5 | 0.1 | 17.4 | 0.1 | 8.7 | 110 |
| 19 | 510 | 2.8 | 182 | 18.2 | 0.1 | 18.1 | 0.2 | 6.5 | 130 |
| 20 | 440 | 2.9 | 152 | 19.8 | 0.1 | 19.7 | 0.2 | 6.8 | 80 |
| 21 | 720 | 2.7 | 267 | 23.4 | 0.2 | 23.2 | 0.2 | 8.6 | 85 |
| 22 | 280 | 2.8 | 100 | 24.7 | 0.1 | 24.6 | 0.2 | 8.8 | 65 |
| 23 | 300 | 2.2 | 136 | 22.4 | 0.2 | 22.2 | 0.2 | 10.1 | 70 |
| 24 | 290 | 2.4 | 121 | 20.8 | 0.2 | 20.6 | 02 | 8.6 | 69 |
| 25 | 285 | 2.2 | 130 | 26.3 | 0.2 | 26.1 | 0.2 | 11.9 | 70 |
| 26 | 320 | 2.7 | 119 | 26.1 | 0.4 | 25.7 | 0.2 | 9.5 | 60 |
| 27 | 270 | 2.3 | 117 | 23.8 | 0.4 | 23.4 | 0.3 | 10.2 | 64 |
| 28 | 300 | 2.3 | 130 | 22.8 | 0.4 | 22.4 | 0.2 | 9.7 | 45 |
| 29 | 340 | 2.4 | 142 | 22.4 | 0.3 | 22.1 | 0.2 | 9.2 | 60 |
| 30 | 270 | 2.7 | 100 | 28.4 | 0.4 | 28.0 | 0.2 | 10.4 | 50 |
| 31 | 270 | 2.6 | 104 | 28.0 | 0.2 | 27.8 | 0.2 | 10.7 | 55 |

What is claimed is:

1. A method of controlling a biological wastewater purification plant, in which the wastewater is aerated in an activation tank in the presence of an activated sludge and, to influence the properties of the activated sludge, phosphorus is added under controlled concentration, which comprises measuring the phosphorus concentration in the activated sludge for the control of the phosphorus addition and controlling the phosphorus addition in such a manner that the phosphorus concentration in the activated sludge is greater than or equal to a lower limit and is less than or equal to an upper limit.

2. The method as claimed in claim 1, wherein the phosphorus concentration measurement is performed on line.

3. The method as claimed in claim 1, wherein the lower limit is 4 and the upper limit is 10 mgP/gDM.

4. The method as claimed in claim 3, wherein the lower limit is 5 and the upper limit is 8 mgP/gDM.

5. The method as claimed in claim 1, wherein the phosphorus concentration of the mixed liquor in the activation tank is measured and used as a measure of the phosphorus concentration of the activated sludge.

* * * * *